US006973643B2

(12) United States Patent
Goldsmith et al.

(10) Patent No.: US 6,973,643 B2
(45) Date of Patent: Dec. 6, 2005

(54) METHOD, SYSTEM AND PROGRAM FOR HANDLING ERRORS OCCURRING IN FUNCTION CALLS

(75) Inventors: Kevin Scott Goldsmith, Tucson, AZ (US); Robert Guy Vining, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 09/932,332

(22) Filed: Aug. 17, 2001

(65) Prior Publication Data

US 2003/0037291 A1 Feb. 20, 2003

(51) Int. Cl.[7] ................................................. G06F 9/44
(52) U.S. Cl. ........................ 717/124; 717/126; 714/25; 714/38; 714/48
(58) Field of Search ................................ 717/124, 126, 717/141, 130; 714/38, 47, 48, 49, 1–2, 15, 714/25; 709/201, 204, 209; 707/2, 203

(56) References Cited

U.S. PATENT DOCUMENTS

| 5,119,377 | A | * | 6/1992 | Cobb et al. .................... 714/38 |
| 5,475,843 | A | * | 12/1995 | Halviatti et al. ............. 717/124 |
| 5,708,774 | A | * | 1/1998 | Boden .......................... 714/38 |
| 5,761,510 | A | * | 6/1998 | Smith et al. ................ 717/124 |
| 5,862,316 | A | * | 1/1999 | Hagersten et al. ............. 714/15 |
| 5,870,559 | A |   | 2/1999 | Leshem, et al. ............. 709/224 |
| 5,895,472 | A |   | 4/1999 | Brodsky, et al. ............. 707/203 |
| 5,909,580 | A |   | 6/1999 | Crelier, et al. .............. 717/141 |
| 5,946,647 | A |   | 8/1999 | Miller, et al. .................. 704/9 |
| 5,958,008 | A |   | 9/1999 | Pogrebisky, et al. ........ 709/223 |
| 6,138,112 | A | * | 10/2000 | Slutz ............................. 707/2 |
| 6,163,858 | A | * | 12/2000 | Bodamer ..................... 714/34 |
| 6,279,124 | B1 | * | 8/2001 | Brouwer et al. ............. 714/38 |
| 6,334,193 | B1 | * | 12/2001 | Buzsaki ........................ 714/2 |
| 6,378,087 | B1 | * | 4/2002 | Flanagan et al. ............. 714/38 |

(Continued)

FOREIGN PATENT DOCUMENTS

WO      0033214      6/2000

OTHER PUBLICATIONS

TITLE: Design verification via simulation and automatic test pattern generation, author: Al-Assad et al, IEEE, 1995.*

(Continued)

*Primary Examiner*—Chameli C. Das

(57) ABSTRACT

Provided is a method, system, and program for handling errors in a service program including service functions capable of being called from application programs. A call is received for one service function from a service function call within one application program. A series of test operations are performed when executing the service function call. Each test operation returns an identifier if the test operation failed where each identifier is associated with one error state. If one test operation failed, then the identifier for the failed test operation is transferred to an error handling agent, wherein the error handling agent accesses error information associated with the identifier and generates error information describing a specific cause of the error that caused the test operation to fail and then returns to the application program with a generic return code.

45 Claims, 5 Drawing Sheets

U.S. PATENT DOCUMENTS

| | | | |
|---|---|---|---|
| 6,381,629 B1 | 4/2002 | Lee | 709/201 |
| 6,401,220 B1 * | 6/2002 | Grey et al. | 714/33 |
| 6,557,115 B2 * | 4/2003 | Gillenwater et al. | 714/25 |
| 6,594,785 B1 * | 7/2003 | Gilbertson et al. | 714/48 |
| 6,598,177 B1 * | 7/2003 | Jones et al. | 714/30 |
| 6,654,911 B1 * | 11/2003 | Miles | 714/38 |
| 6,658,645 B1 * | 12/2003 | Akuta et al. | 717/106 |
| 6,665,824 B1 * | 12/2003 | Ruhlen et al. | 714/57 |
| 6,701,460 B1 * | 3/2004 | Suwandi et al. | 714/41 |
| 6,701,514 B1 * | 3/2004 | Haswell et al. | 717/115 |
| 6,701,519 B1 * | 3/2004 | Cowan | 717/130 |
| 6,708,291 B1 * | 3/2004 | Kidder | 714/39 |
| 6,718,486 B1 * | 4/2004 | Roselli et al. | 714/41 |
| 6,820,251 B1 * | 11/2004 | Dwyer | 717/130 |

OTHER PUBLICATIONS

TITLE: Modeling and Testing a Critical Fault-Tolerant Multi-Process System, author: Riter, IEEE, 1995.*

IBM, Corp., "RPG II Source Mapping Technique," Technical Disclosure Bulletin, vol. 20, No. 6, Nov. 1977, pp. 2391-2392.

IBM Corp., "Dynamic Error Management Function," Technical Disclosure Bulletin, vol. 33, No. 7, Dec. 1990, pp. 380-381.

* cited by examiner

FIG. 3

| Unique Serial Number | Generic Return Code | Detailed Explanation |
|---|---|---|
| ⋮ | ⋮ | |
| 51683412 | ERROR_INVALID_PARAMETER | The first parameter (part number) must be between 4 and 8 characters. The part number value that was specified "VALUE" is an invalid parameter because it is greater than 8 characters. |
| 51683413 | ERROR_INVALID_PARAMETER | The first parameter (part number) must be between 4 and 8 characters. The part number value that was specified "VALUE" is an invalid parameter because it is less than 4 characters. |
| 51683414 | ERROR_INVALID_PARAMETER | The first parameter (part number) must be a numeric value The part number value that was specified "VALUE" is an invalid parameter because it contains alphabetic characters. |
| | ⋮ | |

METHOD, SYSTEM AND PROGRAM FOR HANDLING ERRORS OCCURRING IN FUNCTION CALLS

BACKGROUND OF THE INVENTION

1. Field of the Invention

The present invention relates to a system, method, and program for handling errors occurring in function calls.

2. Description of the Related Art

In many situations, an application program will call service functions of another program or an operating system through an application program interface (API). If an error occurs, the service function may return an error code in response to the call from the calling application program. An application developer or program user may have difficulty isolating the cause of the error based on the returned error code. With many service functions, especially operating system functions, the returned error code is generic to numerous different specific errors and provides little or no assistance in identification of the specific cause of the error. For instance, many operating system service functions often return an error in the form of "ERROR_INVALID_PARAMETER", without specifying the parameter that caused the error and reason the parameter value caused the error. The application developer may then have to spend considerable time re-writing the service function invocation code, compiling, building, and testing using a trial-and-error approach to attempt to diagnose the cause of the error. This diagnosis may be further complicated by the lack of meaningful documentation on the error codes.

In the prior art, different schemes exist for providing error codes from various service functions. For this reason, the number of error codes returned by service functions varies from as few as a couple to dozens and, in some cases, significantly more. In preparation for potential return of these error codes from the service functions, the application developer may then write, compile, build and test error handling code for each service function call within the application program to anticipate and properly handle the various errors returned from the service function. This may include checking for specific error codes and discontinuing processing or issuing a message to a human being or taking other actions that are thought to be appropriate for the specific error code. The time required to develop and test such error handling code is significant. In fact, given the above described complexity, in many cases, the error handling processing within the application may exceed the processing performed by the application program functions. Moreover, often the major emphasis for development and testing in application development is in the mainline path. It is not uncommon for error handling paths to be actually exercised for the first time in an end customer environment where well-intended, but nonetheless improper or nonexistent error handling can cause the application program to behave unexpectedly or to abruptly terminate causing disruption or outages for the end customer and added service costs for the application developer.

Even if the application developer is successful in properly implementing error handling processing for all possible return error codes for a service function, any subsequent updates to the service function that provides new return error codes may require that the application developer again build, compile, and test new error handling processing for the new return error codes introduced by the update. In the prior art, it is not uncommon for the application program error handling to become inconsistent with the potential return error codes from a service function when changes are made to the service function return error codes. Typically, once an application program is developed, ongoing maintenance of this type is often overlooked. For example, when a machine is running an application program that uses a service function provided by an operating system, it is not uncommon for the machine to be updated with operating system maintenance or the operating system to be updated to a newer version without an associated update to each application program to address changes in error codes returned from service functions.

Diagnosis problems are further exasperated in client/server environments where the calling application program is running on a different operating system than the operating system including the service function. In such case, operating system diagnostic information may not be available to the calling application program running on a different operating system platform.

It is also sometimes necessary for providers of the service functions themselves to determine from where within the service function a particular error code was returned. Since generic return codes are used for many errors at different locations, pinpointing the exact location of the error in the service function source code may be extremely difficult because the return code could have been generated at many instances in the service function code.

For these reasons, there is a need in the art for improved techniques for handling and diagnosing errors resulting from function calls.

SUMMARY OF THE PREFERRED EMBODIMENTS

Provided is a method, system, and program for handling errors in a service program including service functions capable of being called from application programs. A call is received for one service function from a service function call within one application program. A series of test operations are performed when executing the service function call. Each test operation returns an identifier if the test operation failed where each identifier is associated with one error state. If one test operation failed, then the identifier for the failed test operation is transferred to an error handling agent, wherein the error handling agent accesses error information associated with the identifier and generates error information describing a specific cause of the error that caused the test operation to fail.

In further implementations, the identifier indicates an occurrence of an error at a unique location in the service program.

Further provided is a method, system, and program for handling errors resulting from execution of a service function in a service program, wherein one application program calls the service function in the service program. An identifier is received from the service program executing the service function. The service program performs a series of test operations when executing the service function, wherein each test operation returns one unique identifier if the test operation failed that is associated with one error state.

If the received identifier indicates that one error occurred during execution of the service function, then a return code is generated and transmitted to the application program indicating that an error occurred.

In further implementations, error information is generated providing a description of the service function error associated with the received identifier. With such implementations, a directory may be provided that includes entries corresponding to identifiers, wherein the directory maintains error information for identifiers describing a specific cause of the test operation failure associated with the identifier. One entry in the directory corresponding to the received identifier is accessed. The generated error information comprises the description of the specific cause of the error state in the directory entry for the received error number.

The described implementations provide a technique for generating error information using an error handling program that provides information to allow developers and other users of an application program to more efficiently and effectively diagnose and correct errors resulting from a service function call invoked by the application program. The described implementations allow pinpointing and exact identification of the error condition, provide an automatic and complete set of diagnostic information, significantly reduce the error handling code developers must generate, and minimize the error data that must be physically sent over a communication network.

BRIEF DESCRIPTION OF THE DRAWINGS

Referring now to the drawings in which like reference numbers represent corresponding parts throughout:

FIG. 3 illustrates an example of a serial number directory used in generating error information in accordance with implementations of the invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
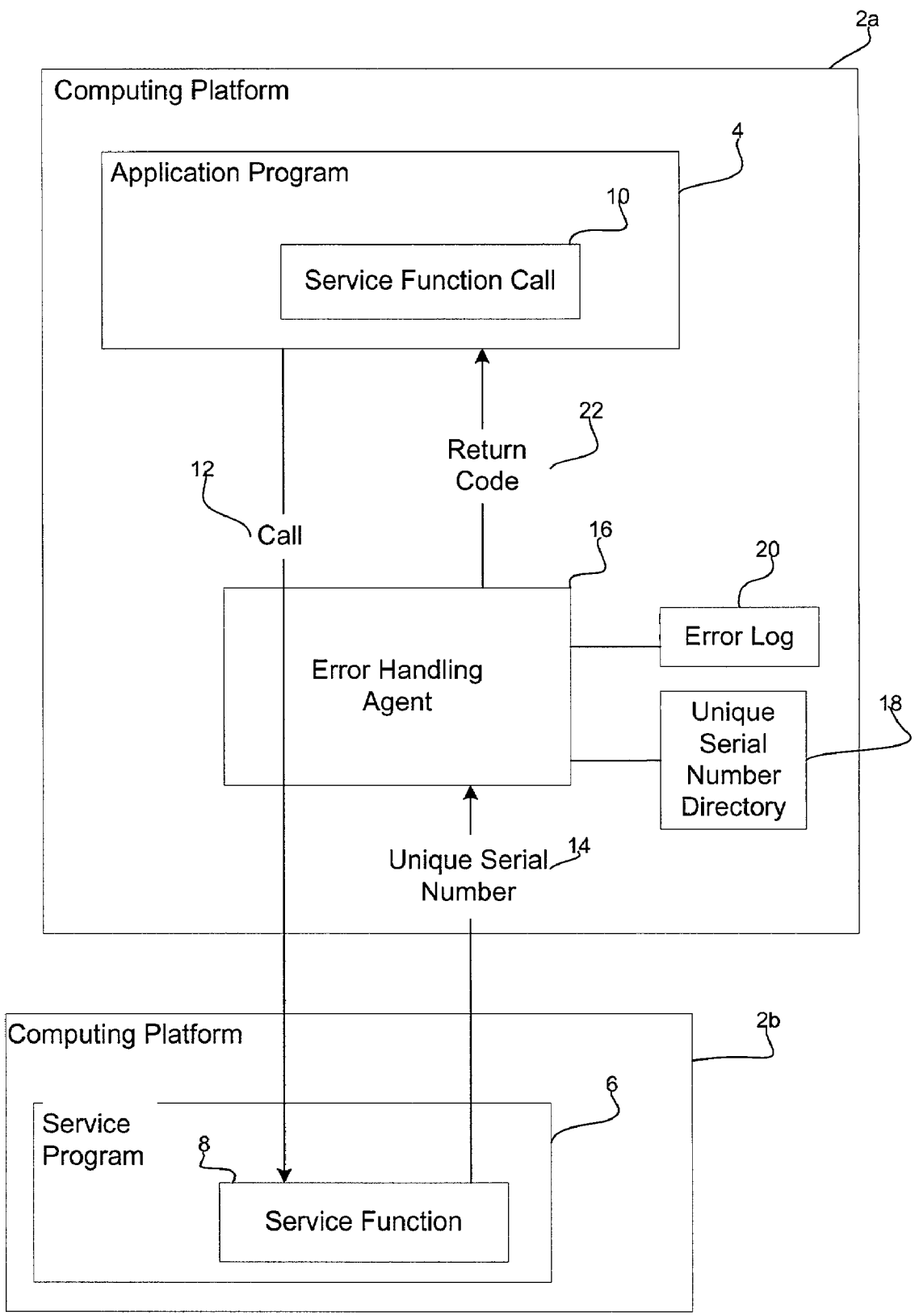
FIG. 1 is a computer architecture in which described implementations are implemented.

FIG. 1 illustrates a computing environment in which aspects of the invention are implemented. Each computing platform 2a, b includes one or more computer systems executing one or more operating systems. The operating systems (not shown) in the computing platforms 2a, b may be different or the same. Alternatively, the two computing platforms 2a, b may comprise different operating systems executing on the same computer hardware device. An application program 4 executes in the computing platform 2a and service program 6 executes in the computing platform 2b. The service program 6 may comprise any program that provides service functions 8 that may be called or invoked by the application program 4, or other programs running on the computing platform 2. For instance, the service program 6 may comprise an operating system, and the service functions 8 would comprise the services offered by the operating system. The application program 4 may comprise any application program known in the art including interfaces shown as service function call 10, such as application programming interfaces (APIs), to call service functions 8 at the service program 6.

The service function call 10 in the application program 4, when executed, would make a call 12 to the service function 8 to execute the service function 8. The call 12 may include parameters set by the application program 4. In response to the call 12, the service function 8 would execute and generate a unique serial number 14, which may comprise any alpha-numeric or other type of code or identifier, such as a hexadecimal value, of an error state that occurred during execution of the service function 8.

The service program 4 transmits the unique serial number 14 to an error handling agent 16, which comprises a program layer between the application program 4 and service program 6. The error handling agent 16 provides special handling of the unique serial number 14, which comprises a unique serial number that the service function 8 generates when performing error testing. This unique serial number identifies one particular error state ascertained by one specific testing operation at one specific location within the source code of the service program. For instance, the service function 8 may perform a series of error test operations on a parameter passed with the call 12. Each error state in the sequence of test operations would correspond to a specific error, such as the parameter having a specific erroneous value. The service function 8 would provide a unique serial number for each possible error state tested by the service function 8 code to uniquely identify the point in the service program 6 code where the error occurred and the reason for the error.

If the service function 8 completed execution without encountering any error states, then the unique serial number 14 may be zero or some other value indicating that no error was encountered.

In additional implementations, the service function 8 may return additional data along with the unique error number. For instance, if the error is generated as the result of the presence of a certain environmental condition, such as low memory, then information on that environmental condition that triggered the error state may be included in the return code. Other additional data related to the error state may also be returned.

If the unique serial number 14 indicates an error state in the service program 6, then the error handling agent 16 processes a serial number directory 18 that maintains further information on the error identified by the serial number. The error handling agent 16 may then write detailed error information to an error log 20. Based on the content of the serial number directory 18 and the received unique serial number 14, the error handling agent 16 generates return code 22, which is returned to the application program 4. If the service function 8 completed successfully, then the return code 22 may be zero or some other value indicating no error occurred. If the service function 8 failed, then the return code 22 may comprise a generic error code or general description that applies to many specific error states, i.e., many unique error numbers may be defined by a single generic error code, e.g., invalid parameter. The error handling agent 16 would obtain the generic error code or description for a received unique serial number 14 from the entry in the serial number directory 18 for the received unique serial number 14. In additional implementations, the error handling agent 16 may return additional data with the return code 22 returned to the service function call 10.

By using the unique serial number 14, minimal data is returned by the service function 8. The unique serial number 14 provides all the context information about the source of the error through a lookup of the unique serial number in the serial number directory 16. This minimizes the amount of data that must be transmitted over a network from the service function 8 to the error handling agent 16. Since the invocation of the service function 8 passes through the error handling agent 16, the error handling agent 16 has the context information needed to identify what service function was invoked and what parameters were passed to the service function.

Figure 2:
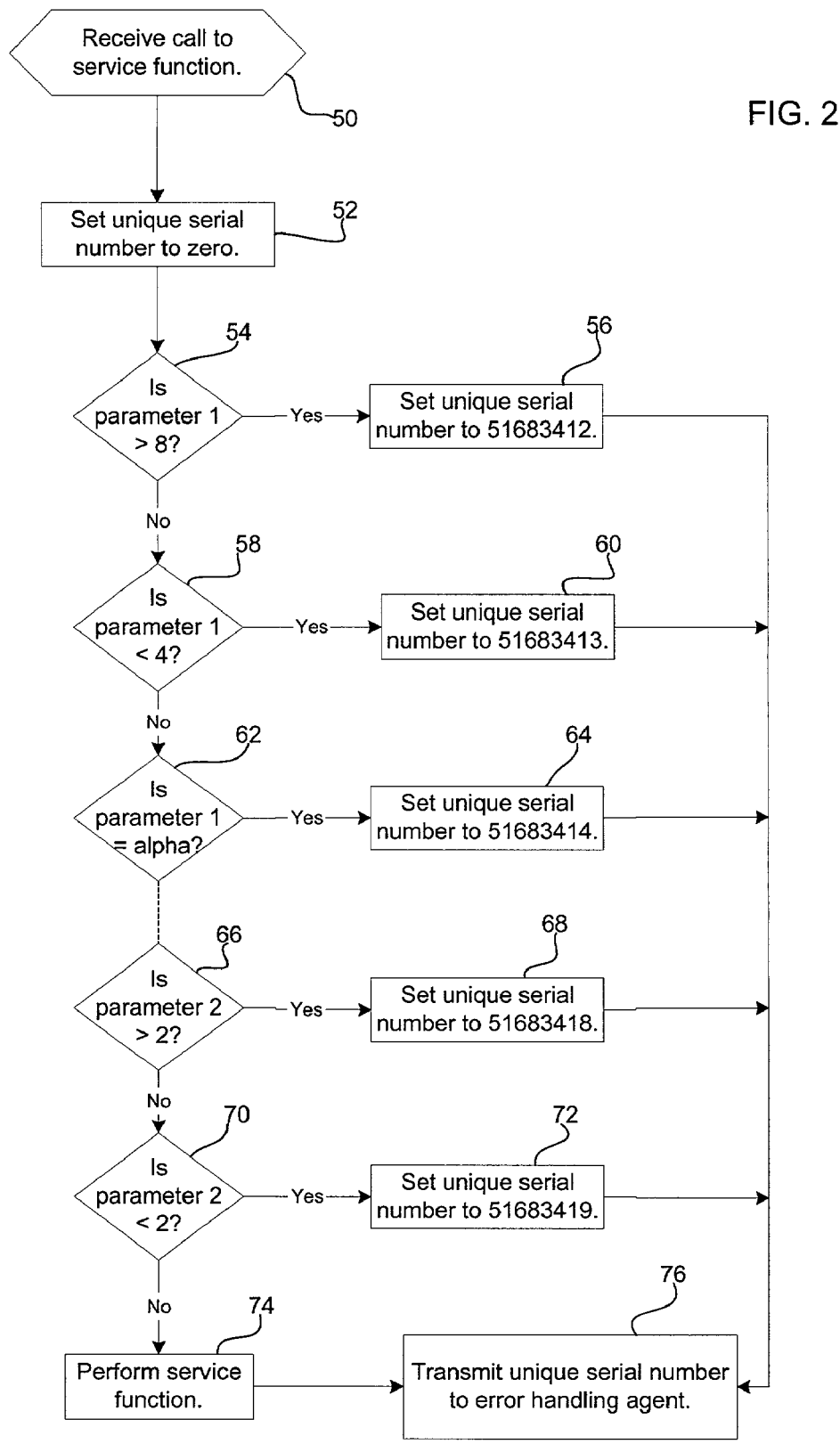
FIG. 2 illustrates logic implemented in the called service function to provide error information in accordance with implementations of the invention.

FIG. 2 illustrates an example of logic implemented in the service function 8 to generate the unique serial number 14 for each error state in the statement execution sequence of the service function 8 code. Control begins at block 50 when the service program 8 receives the call 12 and, in response, executes the service function code 8. The service function 8 initializes (at block 52) the unique serial number 14 to zero. Blocks 54 through 72 provide an example of a series of tests performed to qualify parameters 1 and 2 received with the call 12. For each specific parameter tested at blocks 54, 58, 62, 66, and 70, failing a test results in setting the unique serial number 14 corresponding to the specific error state at blocks 56, 60, 64, 68, and 72, respectively. After setting the unique serial number 14 to a unique value corresponding to an error state at blocks 56, 60, 64, 68, and 72, control proceeds to block 76 to transmit the unique serial number 14 to the error handling agent 16. If the specific parameter test passes, then control proceeds to the next parameter test. If all tests complete successfully, then control proceeds to block 74 to perform the specific service function 8 action and transmit the unique serial number 14 to the error handling agent 16.

In FIG. 2, the test performed determined whether the parameters provided with the call 12 were acceptable. In additional implementations, the tests embedded in the service function 8 to set the unique serial number may consider factors other than parameters. For instance, the service function 8 may test various environmental variables concerning the state of the system, e.g., available system memory, availability of data needed by the service function 8, etc.

FIG. 3 illustrates an example of an implementation of the serial number directory 18 that includes an entry for each possible unique serial number 14 that can be generated by any service function 8 in the service program 6. Each entry includes the unique serial number 100, a generic error return code 102 produced by the service program 8 to generally define the error, and a detailed explanation 104 as to the reasons for the error. Further, each entry in the serial number directory 18 may include variables, e.g., "VALUE", that are filled-in with data from the invocation of the service function call 10. In the example of FIG. 3, the variable "VALUE" in the detailed explanation 104 is replaced with the actual parameter value in that caused the error.

Figure 4:
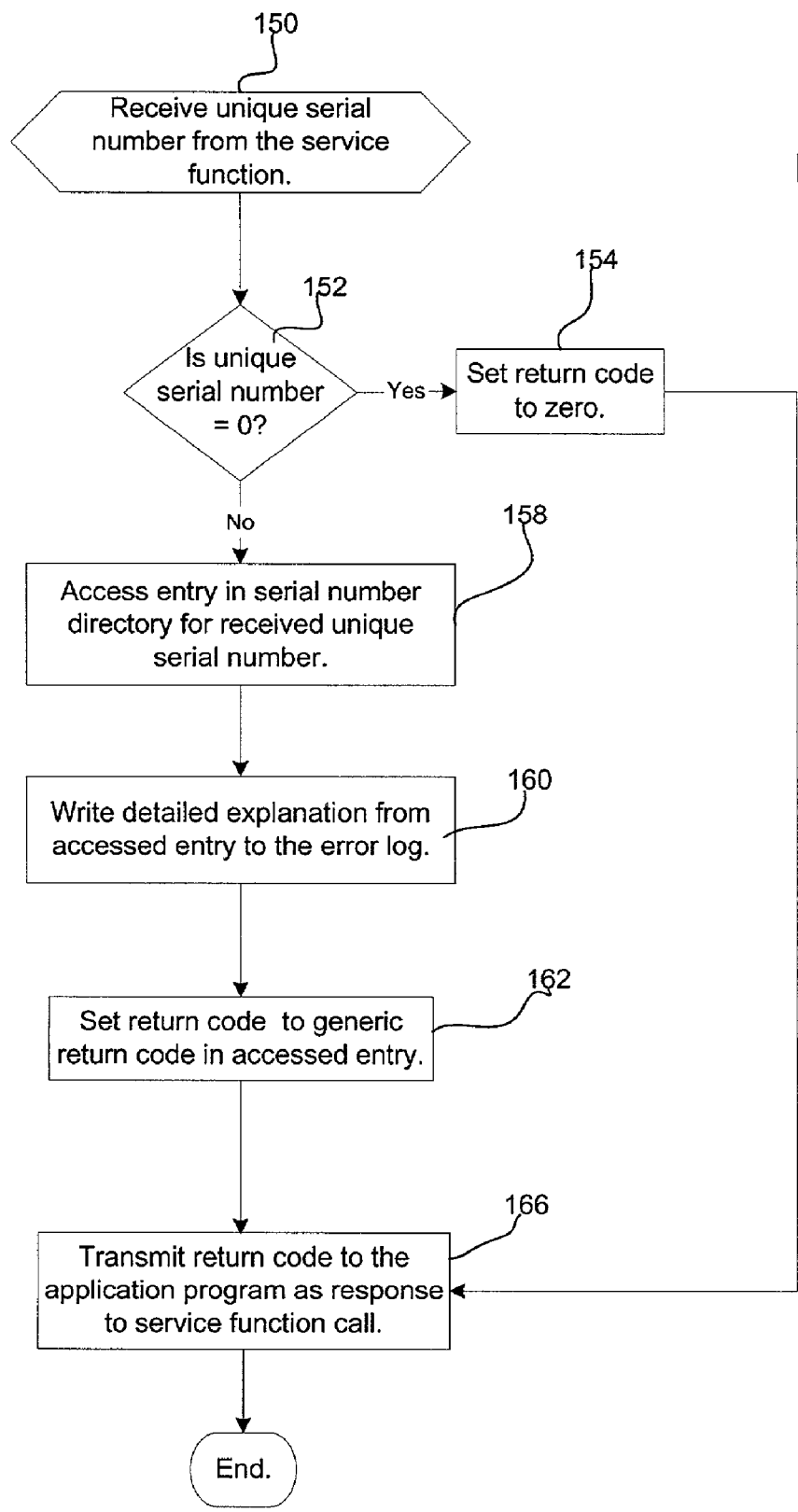
FIG. 4 illustrates logic implemented in an error handling agent to generate error information in accordance with implementations of the invention.

FIG. 4 illustrates logic implemented in the error handling agent 16 to process the unique serial number 14 received from the service function 8. Control begins at block 150 when the error handling agent 16 receives a unique serial number 14 from the service function 8. If (at block 152) the unique serial number 14 value is zero, or some other value indicating that the service function 8 completed successfully, then the return code 22 is set (at block 154) to zero, or some other value indicating that the service function completed successfully. If (at block 152) the received unique serial number 14 is not zero, indicating that an error state occurred during execution of the service function 8, then the error handling agent 16 accesses (at block 158) the entry in the serial number directory 18 for the unique serial number 14. The error handling agent 16 then writes (at block 160) the detailed explanation 102 of the accessed entry to the error log 20. In implementations where additional data is provided with the received unique serial number 14, the error handling agent 16 may write such additional received data to the error log 20.

The error handling agent 16 further sets (at block 162) the return code 22 to the generic return code 102 value in the accessed entry of the serial number directory 18. In implementations where additional data is received with the unique serial number 14 from the service function 8, such additional data may be passed to the application program 4. From blocks 154 or 162, control proceeds to block 166 to transmit the generated return code 22 to the application program 4.

Figure 5:
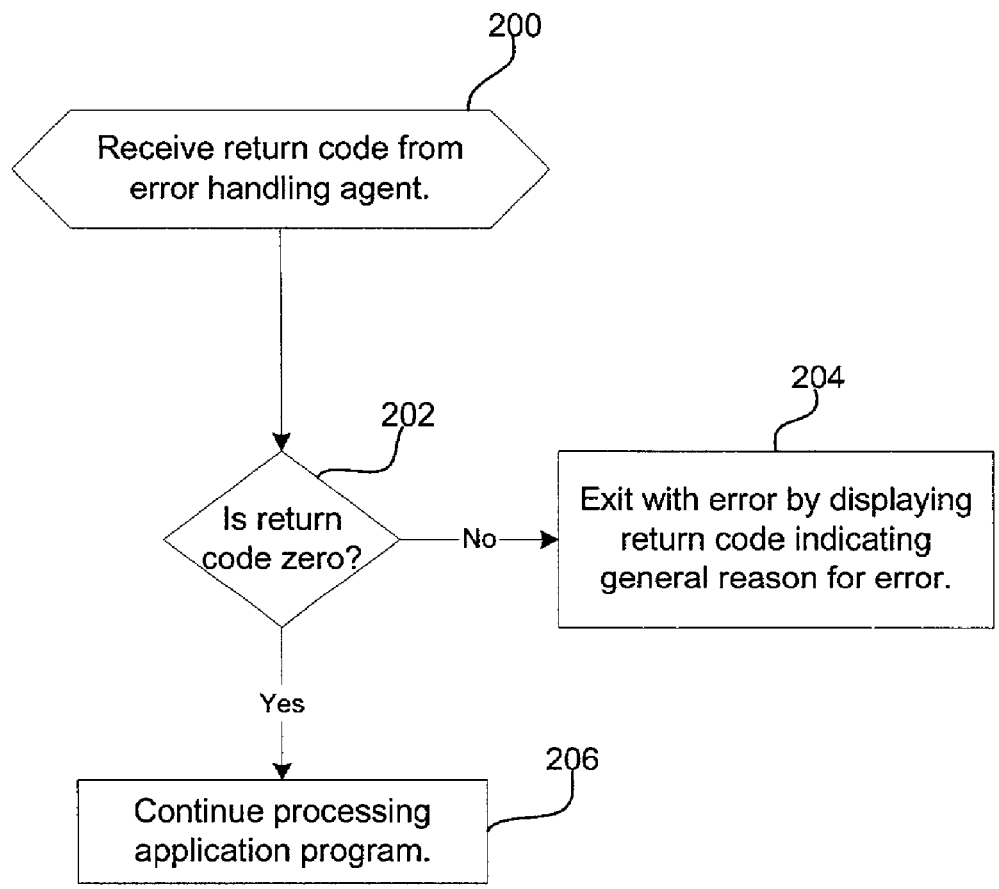
FIG. 5 illustrates logic implemented in the application program to process error information from the error handling program in accordance with implementations of the invention.

FIG. 5 illustrates logic implemented in the application program 4 to process the return code 22 received from the error handling agent 16 at block 200. If (at block 202) the return code 22 is not zero, indicating that an error occurred, then the application program 4 would exit with an error and display the value of the return code 22, which may comprise a generic error description. e.g., invalid parameter. Otherwise, if the return code 22 is zero, then processing continues of the code in the application program 4 following the previously processed service function call 10, which may involve processing further service function calls 10.

The user or developer of the application program 4 may specify different actions to take in the event that the return code 22 indicates the occurrence of one or more specific error states. The user or developer may specify that the application program 4 continue processing if the error state is non-fatal or immediately exit program 4 execution upon the occurrence of the error state. If the application program 4 continues processing, then the return code 22 may be displayed momentarily or written to a file of returned non-fatal codes. The displayed error information would include the return code 22 generic description. The user or developer may further access the error log 20 to review detailed information on error states that occurred during execution of the application program 4.

For instance, a developer may want the application program 4 to continue processing as far as possible and generate detailed error information into the error log 20 for later review. Alternatively, a user of the application program 4 may want to immediately review detailed information on the error state upon the occurrence of the error so they can take immediate corrective action. For instance, if the user is inputting data that is causing error states, then immediate display of detailed error information, including corrective actions to take to avoid the error, may be provided so the user can avoid entering erroneous data in the future.

In further implementations, the serial number directory 18 may be associated with a particular version of the service program 6. Upon initialization, the error handling agent 16 may check the version number of the service program 8. If the version has changed since the last initialization, then the error handling agent 16 may request an updated serial number directory 18 from the service program 6. The update would provide an updated serial number directory from the service program 6 to the error handling agent 16. This version checking ensures that any updates that add, modify or remove service functions 8 in a manner that affects the error numbers returned by the service function 8 are reflected in the serial number directory 18 used by the error handling agent 16.

With the above described arrangement, the calling application program does not have to be rewritten, recompiled, rebuilt, and retested whenever the service program 6 is updated with new error states. The error handling agent 16 automatically ensures that any new unique serial numbers corresponding to error states are incorporated into the serial number directory 18, thereby providing binary compatibility between the application program and the service program.

As discussed, the application program 4 and service program 6 may execute on different computer systems and operating systems. In the described implementations, the error handling agent 16 provides a portable extension of the service function. This allows the error handling agent 16 to provide diagnostic and error information to the application program 4 without depending on the operating system of the service program 6 to assist with diagnostic operations. Further, the error handling agent 16 may include serial number directories 18 for different operating systems. This would allow the error handling agent 16 to provide diagnostic information and error handling on all operating systems that the service program 6 executes.

The described implementations minimize the error handling code needed in the application program 4 by automating error handling in the agent 16. With the described implementations, application developers do not have to spend time incorporating diagnostic routines into the application code because detailed error information is provided through the error handling agent 16.

In certain implementations, the error handling agent 16 functions as a portable extension of the service function 8 that resides on the same platform as the application program 6 and is inserted between the application program 6 and the service function 8 to offload error handling from the application program 6 to an extension of the service function 8. The extension of the service function can accurately perform error handling on behalf of the service function.

The described error handling agent may be incorporated into new software architectures as well as added to existing application programs without modifications to these application programs (although the service functions would have to be modified to generate the unique serial numbers) to obtain the benefits from the error handling agent. Such incorporation of the described error handling agent may allow for exact identification of the error condition, an automatic and complete set of diagnostic information, significant reduction in error handling code and associated savings for application developers, avoidance of inconsistencies when the service function changes, minimizing error data that must be physically sent over a communication network, and, for service function providers, the ability to pinpoint the exact location the error was detected.

The described implementations may reduce the software development effort, time and cost by allowing service function developers and end users to readily pinpoint the exact location of error detection and access reliable and accurate error handling information. Further, the described implementations provide information to end users to assist in diagnosing problems when they occur.

Additional Implementation Details

The described implementations may be realized as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In further implementations, the additional data may be included with the unique serial number 14 from the service function 8 that is related to the cause of the error. This additional information may be written to the entry in the error log 20 for the particular error state to allow the developer to determine the instance in the application program 4 where the error occurred. Such information would allow the developer to determine whether any related processing in the application program 4 code proximate to the location where the failed service function call 10 was made contributed to the error.

In further implementations, additional notification actions may be taken after writing information on an error to the error log 20. For instance, either the application program 4 or error handling agent 16 may generate a message including information on an error added to the error log 20 and transmit such message to a designated user. The message may be transmitted as an electronic message transmitted through a messenger program, e-mail, pager alert, phone call with generated voice message describing the error, etc.

In the described implementations, the error handling agent 16 was described as a program component layer between the application program 4 and service program 6. Alternatively, the error handling agent 16 may be incorporated as a program component within the application program 4.

The described error handling agent may be employed in new implementations as well as retrofitted to existing application programs without modifications to these application programs (although modifications must be made to the service function 8 to generate unique serial numbers for each specific error state) to obtain the benefits from the error handling agent.

In FIG. 1, the error handling agent 16 is shown as handling errors for one application program 4. Additionally, the error handling agent 16 may handle function calls and errors for multiple application programs accessing service functions 8 in the service program 6. Moreover, a single log could be used for all applications or separate logs could be configured for each application.

The preferred logic of FIGS. 2, 4, and 5 describe specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for handling errors in a service program including service functions capable of being called from application programs, comprising:

receiving a call for one service function from a service function call within one application program;

performing a series of test operations when executing the service function call, wherein each test operation returns an identifier if the test operation failed, wherein each identifier is associated with one error state;

if one test operation failed, transmitting the identifier associated with the error state of the failed test operation to an error handling agent, wherein the error handling agent accesses error information associated with the identifier and generates error information describing a specific cause of the error that caused the test operation to fail;

generating error information providing a description of a service function error associated with a received identifier;

providing a directory including entries corresponding to identifiers capable of being received from the service function, wherein the directory maintains error information for identifiers that describes a specific cause of the test operation failure associated with the identifier;

accessing one entry in the directory corresponding to the received identifier, wherein the generated error information comprises the description of a specific cause of the error in the directory entry for the received identifier;

detecting a change in a version number of the service program;

accessing an updated directory reflecting changes resulting from an update to service functions in the service program; and replacing the directory with the updated directory, wherein the updated directory is capable of including modifications to the identifiers and error information.

2. The method of claim 1, wherein the identifier indicates an occurrence of an error at a unique location in the service program.

3. The method of claim 1, further comprising:

if no test operation for the called service function failed, then transmitting one identifier indicating that no error occurred to the error handling agent.

4. The method of claim 1, wherein the error handling agent is separate from the service program receiving the call.

5. A method for handling errors resulting from execution of a service function in a service program, wherein one application program calls the service function in the service program, comprising:

receiving an identifier from the service program executing the service function, wherein the service program performs a series of test operations when executing the service function, wherein each test operation returns one identifier if the test operation failed that is associated with one error state;

if the received identifier indicates that one error occurred during execution of the service function, then generating and transmitting a return code to the application program indicating that an error occurred;

generating error information providing a description of a service function error associated with the received identifier;

providing a directory including entries corresponding to identifiers capable of being received from the service function, wherein the directory maintains error information for identifiers that describes a specific cause of the test operation failure associated with the identifier;

accessing one entry in the directory corresponding to the received identifier, wherein the generated error information comprises the description of a specific cause of the error in the directory entry for the received identifier;

detecting a change in a version number of the service program;

accessing an updated directory reflecting changes resulting from an update to service functions in the service program; and replacing the directory with the updated directory, wherein the updated directory is capable of including modifications to the identifiers and error information.

6. The method of claim 5, wherein the identifier indicates an occurrence of an error at a unique location in the service program.

7. The method of claim 5, further comprising:

if the received identifier indicates that one error did not occur during execution of the service function, then the generated return code indicates that no error occurred.

8. The method of claim 5, further comprising:

returning additional data describing the error to the application program if the return code indicates that one error occurred.

9. The method of claim 5, wherein the return code comprises generic error information, wherein one return code is used to provide generic error information for multiple identifiers.

10. The method of claim 5, further comprising:

receiving data related to the failed test operation from the service program; and including the received data related to the failed test operation within the generated error information.

11. The method of claim 5, further comprising:

writing the generated error information to a log file.

12. The method of claim 5, wherein the directory further maintains a generic error code in each entry, wherein the same generic error code is used for multiple identifiers providing a general description of the error state resulting from the failure of the test operation, and wherein the return code transmitted to the application program comprises the generic error code for the received identifier in the directory.

13. The method of claim 5, wherein the application program and service program execute on different computer systems.

14. The method of claim 5, wherein the application program and service program run on different operating system platforms.

15. The method of claim 5, wherein the service program comprises an operating system program.

16. The method of claim 5, wherein the steps of receiving the identifier, generating the error information, and transmitting the return code are performed by a program that is external to the application program and service program.

17. A system for handling errors resulting from execution of a service function in a service program, comprising:
(a) at least one computer readable medium, including:
   (i) an application program;
   (ii) a service program;
   (iii) at least one service function included in the service program;
   (iv) an error handling agent;
(b) means, performed by the application program, for calling one service function in the service program;
(c) means, performed by the service program in response to the call to the service function, for:
   (i) performing a series of test operations when executing the service function, wherein each test operation returns one identifier if the test operation failed that is associated with one error state;
   (ii) transmitting the identifier associated with the error state of the failed test operation to the error handling agent if one test operation failed; and
(d) means, performed by the error handling agent, for:
   (i) receiving the identifier from the service program executing the service function;
   (ii) generating and transmitting a return code to the application program indicating that an error occurred if the received identifier indicates that one error occurred during execution of the service function;
   (iii) generating error information providing a description of a service function error associated with the received identifier;
   (iv) providing a directory including entries corresponding to identifiers capable of being received from the service function, wherein the directory maintains error information for identifiers that describes a specific cause of the test operation failure associated with the identifier; and
   (v) accessing one entry in the directory corresponding to the received identifier, wherein the generated error information comprises the description of a specific cause of the error in the directory entry for the received identifier;
   (vi) detecting a change in a version number of the service program;
   (vii) accessing an updated directory reflecting changes resulting from an update to service functions in the service program; and
   (viii) replacing the directory with the updated directory, wherein the updated directory is capable of including modifications to the identifiers and error information.

18. The system of claim 17, wherein the identifier indicates an occurrence of an error at a unique location in the service program.

19. The system of claim 17, wherein the generated return code indicates that no error occurred if the received identifier indicates that one error did not occur during execution of the service function.

20. The system of claim 17, wherein the means performed by the error handling agent further performs:
returning additional data describing the error to the application program if the return code indicates that one error occurred.

21. The system of claim 17, wherein the return code comprises generic error information, wherein one return code is used to provide generic error information for multiple identifiers.

22. The system of claim 17, wherein the means performed by the error handling agent further performs:
receiving data related to the failed test operation from the service program; and
including the received data related to the failed test operation within the generated error information.

23. The system of claim 17, wherein the means performed by the error handling agent further performs:
writing the generated error information to a log file.

24. The system of claim 17, wherein the directory further maintains a generic error code in each entry, wherein the same generic error code is used for multiple identifiers providing a general description of the error state resulting from the failure of the test operation, and wherein the return code transmitted to the application program comprises the generic error code for the received identifier in the directory.

25. The system of claim 17, wherein the application program and service program execute on different computer systems.

26. The system of claim 17, wherein the application program and service program run on different operating system platforms.

27. The system of claim 17, wherein the service program comprises an operating system program.

28. The system of claim 17, wherein the error handling agent executes externally from the application program and service program.

29. The system of claim 17, wherein each error state is associated with one location in source code for the service function call.

30. An article of manufacture including code for handling errors in a service program including service functions capable of being called from application programs by:
receiving a call for one service function from a service function call within one application program;
performing a series of test operations when executing the service function call, wherein each test operation returns an identifier if the test operation failed, wherein each identifier is associated with one error state;
if one test operation failed, transmitting the identifier associated with the error state of the failed test operation to an error handling agent, wherein the error handling agent accesses error information associated with the identifier and generates error information describing a specific cause of the error that caused the test operation to fail;
generating error information providing a description of a service function error associated with a received identifier;
providing a directory including entries corresponding to identifiers capable of being received from the service function, wherein the directory maintains error information for identifiers that describes a specific cause of the test operation failure associated with the identifier;
accessing one entry in the directory corresponding to the received identifier, wherein the generated error information comprises the description of a specific cause of the error in the directory entry for the received identifier;
detecting a change in a version number of the service program;
accessing an updated directory reflecting changes resulting from an update to service functions in the service program; and
replacing the directory with the updated directory, wherein the updated directory is capable of including modifications to the identifiers and error information.

31. The article of manufacture of claim 30, wherein the identifier indicates an occurrence of an error at a unique location in the service program.

32. The article of manufacture of claim 30, further comprising:
if no test operation for the called service function failed, then transmitting one identifier indicating that no error occurred to the error handling agent.

33. The article of manufacture of claim 30, wherein the error handling agent is separate from the service program receiving the call.

34. An article of manufacture for handling errors resulting from execution of a service function in a service program, wherein one application program calls the service function in the service program, by:
receiving an identifier from the service program executing the service function, wherein the service program performs a series of test operations when executing the service function, wherein each test operation returns one identifier if the test operation failed that is associated with one error state;
if the received identifier indicates that one error occurred during execution of the service function, then generating and transmitting a return code to the application program indicating that an error occurred:
generating error information providing a description of a service function error associated with the received identifier;
providing a directory including entries corresponding to identifiers capable of being received from the service function, wherein the directory maintains error information for identifiers that describes a specific cause of the test operation failure associated with the identifier;
accessing one entry in the directory corresponding to the received identifier, wherein the generated error information comprises the description of a specific cause of the error in the directory entry for the received identifier;
detecting a change in a version number of the service program;
accessing an updated directory reflecting changes resulting from an update to service functions in the service program; and
replacing the directory with the updated directory, wherein the updated directory is capable of including modifications to the identifiers and error information.

35. The article of manufacture of claim 34, wherein the identifier indicates an occurrence of an error at a unique location in the service program.

36. The article of manufacture of claim 34, further comprising:
if the received identifier indicates that one error did not occur during execution of the service function, then the generated return code indicates that no error occurred.

37. The article of manufacture of claim 34, further comprising:
returning additional data describing the error to the application program if the return code indicates that one error occurred.

38. The article of manufacture of claim 34, wherein the return code comprises generic error information, wherein one return code is used to provide generic error information for multiple identifiers.

39. The article of manufacture of claim 34, further comprising:
receiving data related to the failed test operation from the service program; and
including the received data related to the failed test operation within the generated error information.

40. The article of manufacture of claim 34, further comprising:
writing the generated error information to a log file.

41. The article of manufacture of claim 34, wherein the directory further maintains a generic error code in each entry, wherein the same generic error code is used for multiple identifiers providing a general description of the error state resulting from the failure of the test operation, and wherein the return code transmitted to the application program comprises the generic error code for the received identifier in the directory.

42. The article of manufacture of claim 34, wherein the application program and service program execute on different computer systems.

43. The article of manufacture of claim 34, wherein the application program and service program run on different operating system platforms.

44. The article of manufacture of claim 34, wherein the service program comprises an operating system program.

45. The article of manufacture of claim 34, wherein the steps of receiving the identifier, generating the error information, and transmitting the data are performed by a program that is external to the application program and service program.

* * * * *